Figure 3:
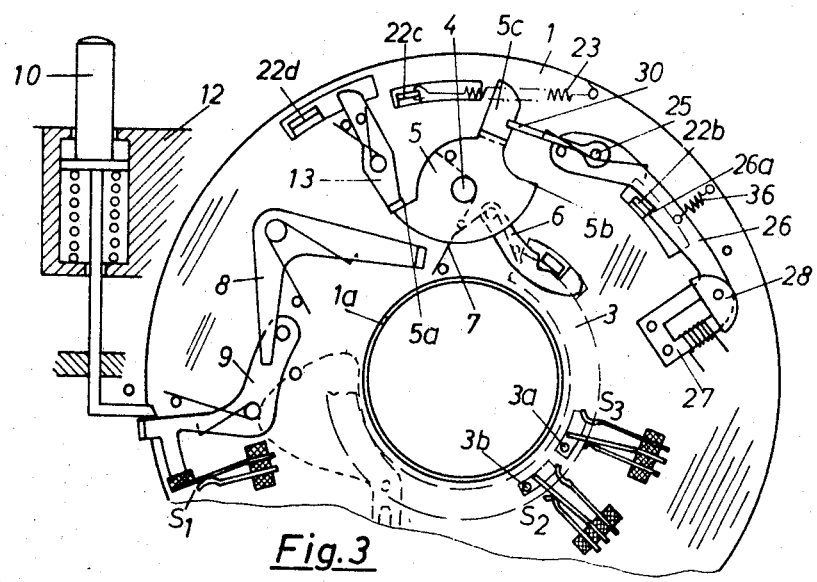

United States Patent

[11] 3,584,561

| [72] | Inventor | Franz W. R. Starp<br>Calmbach, Black Forest, Germany |
|---|---|---|
| [21] | Appl. No. | 812,651 |
| [22] | Filed | Apr. 2, 1969 |
| [45] | Patented | June 15, 1971 |
| [73] | Assignee | Prontor-Werk Alfred Gauthier G.m.b.H.<br>Calmbach Black Forest, Germany |
| [32] | Priority | Apr. 3, 1968 |
| [33] | | Austria |
| [31] | | A3254/68 |

[54] LENS SHUTTERS
10 Claims, 7 Drawing Figs.

[52] U.S. Cl. .................................................. 95/63, 195/64
[51] Int. Cl. .................................................. G03b 9/14
[50] Field of Search .......................................... 95/53, 53 E, 64, 63

[56] References Cited
UNITED STATES PATENTS
2,980,003  4/1961  Draghi et al. ................ 95/63
3,096,700  7/1963  Willcox et al. ................ 95/63
3,169,462  2/1965  Kessler et al. ................ 95/64 X
3,421,427  1/1969  Starp ............................ 95/63

*Primary Examiner*—Samuel S. Matthews
*Assistant Examiner*—Michael D. Harris
*Attorney*—March, Le Fever and Wyatt ABSTRACT: A photographic lens shutter is provided that has a first blade system movable to an open and closed position with a driving mechanism having a stop which locks its movement when the blades reach the open position. A second blade system is provided which acts as a diaphragm and has a driving mechanism with an electromagnetic locking device associated therewith for releasing the driving mechanism when actuated by an electronic timing device. A release member is provided on the driving mechanism of the second blade system which acts in the end phase of the movement thereof to disengage the stop of the first blade system.

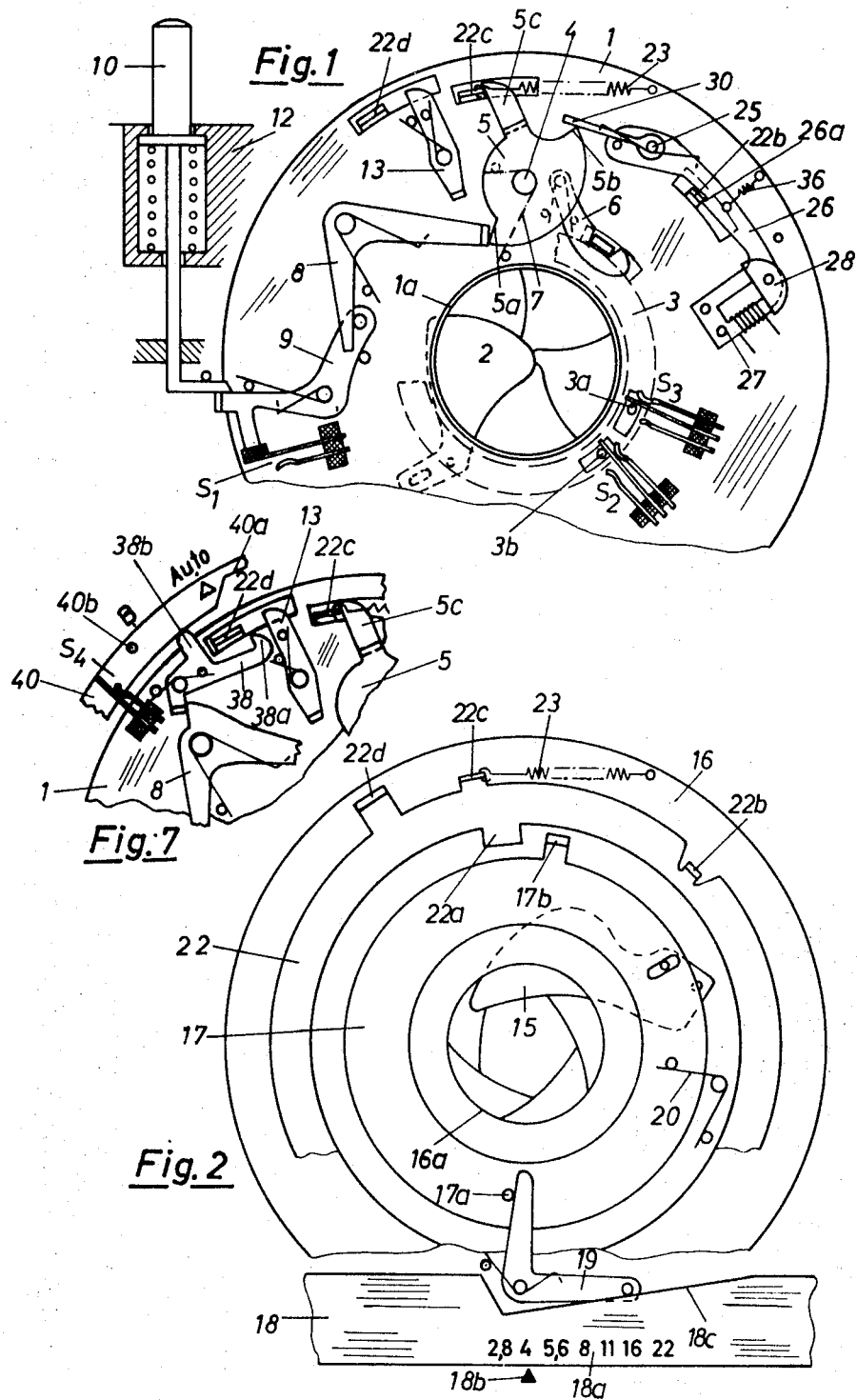

INVENTOR
Franz W.R. Starp
BY
March, Gillette & Wyatt
ATTORNEYS

LENS SHUTTERS

The invention related to a photographic lens shutter having a first blade system always fully exposing the lens aperture when the blades are open, and a second blade system adapted to be manually preset to a required aperture, and closing the lens aperture when required, with an electric time control device causing the second blade system to close after a time interval beginning with the opening of the first blade system.

Shutters having a separate blade opening system and a separate blade closing system as such have the advantage that they allow very short exposure times to be obtained. In one type of known shutter, the opening and closing blades have an electromagnet and a return spring each, associated therewith as drive. When the shutter is released, a first electromagnet moves the opening blades against the action of their return spring into an open position, whilst the closing blades are moved in dependence upon an electric time control circuit by means of a second electromagnet also against spring action, from a fully open position into a closed position. Subsequently the two blade systems return to their normal positions under the influence of their springs. One of this known shutter system is that it does not allow a diaphragm to be preset to a required value. Moreover, the effective diaphragm aperture during exposure is obtained by an overlap of the opening and closing movement of the two blade systems. Again the kind of driving device is not ideal, since it requires a battery of adequate size in the camera, and also necessitates carrying one or more spare batteries.

A shutter is also known having two shearlike opening blades and two closing blades arranged coaxially thereto, the latter also acting as diaphragm. The closing blades, when the camera release is actuated, change over from a closed position to an open position which is preset by an exposure meter. The latter also determines the period of time after which the diaphragm blades are again moved into the closed position to terminate exposure. This shutter is costly and therefore suitable only for high-class cameras.

The object of the present invention is to provide a shutter of the type referred to, using a driving means which is simple, involves few parts and is reliable in operation. In accordance with the invention a first blade system is formed so as to reciprocate in known manner, and its driving mechanism has a stop locking its movement when the blades reach their open position; the driving mechanism of the second blade system has an electromechanical locking mechanism releasing the driving mechanism for releasing the blades by cooperation with an electric time control device, means being provided on the driving mechanism of the second blade system which, acting in the end phase of the movement action, disengages the stop of the first blade system. Hence a shutter with conventional mechanical drive to reciprocate the blades is provided by means of which delay in the exposure action caused by the reciprocation of the blades has been eliminated, therefore allowing extremely short exposure times to be obtained, together with a smooth regulation of the exposure times down to the shortest exposure time. In addition a double safeguard against "leakage light" is obtained.

A simple structure of the shutter is obtained in that the stop cooperating with the first blade system is formed as a catch lever, and the driving mechanism of the second blade system includes a ring adapted to be moved into the cocked position, whilst the electromagnetic mechanical locking device includes a spring-loaded stop lever provided with a catch edge, which at one end carries the armature of an electromagnet which is connected in the circuit of the electric timing device.

In order to enable the two drives to be moved into the cocked position by means of a single actuating member, such as the high speed cocking lever, and to provide a simple structure for the cocking mechanism, the driving mechanisms of the first and second blade systems are so associated with one another that both are moved simultaneously into the cocked position. This is brought about by arranging that the driving mechanism of the first blade system is in positive operational engagement with the second blade system during cocking.

The reliability of the shutter assembly is further increased in that the second blade system is preadjustable to the required aperture width by means of an actuating mechanism engaging it positively.

To allow "B" exposures also to be made with the shutter, without hereby using the battery of the electric timing device, the second blade system is provided with a catch lever giving time exposures and interconnected with a range setter and the shutter release, and the range setter itself is associated with a cutout switch for the time control device.

Figure 6:
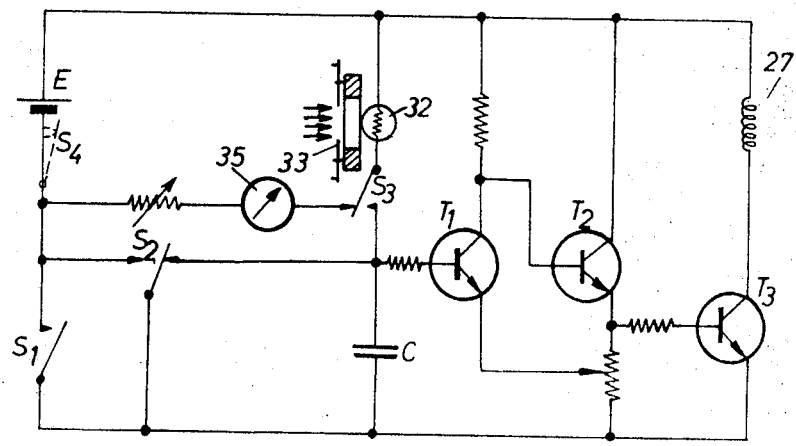
Figure 5:
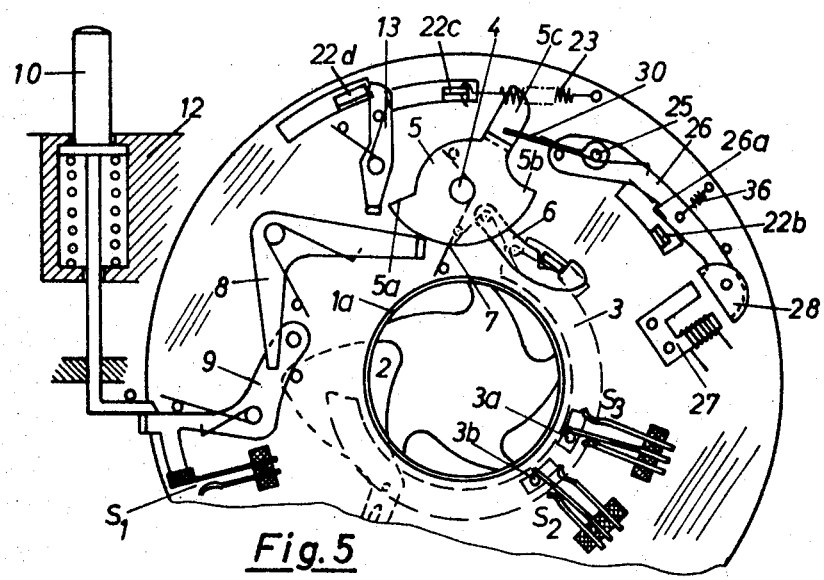
Figure 4:
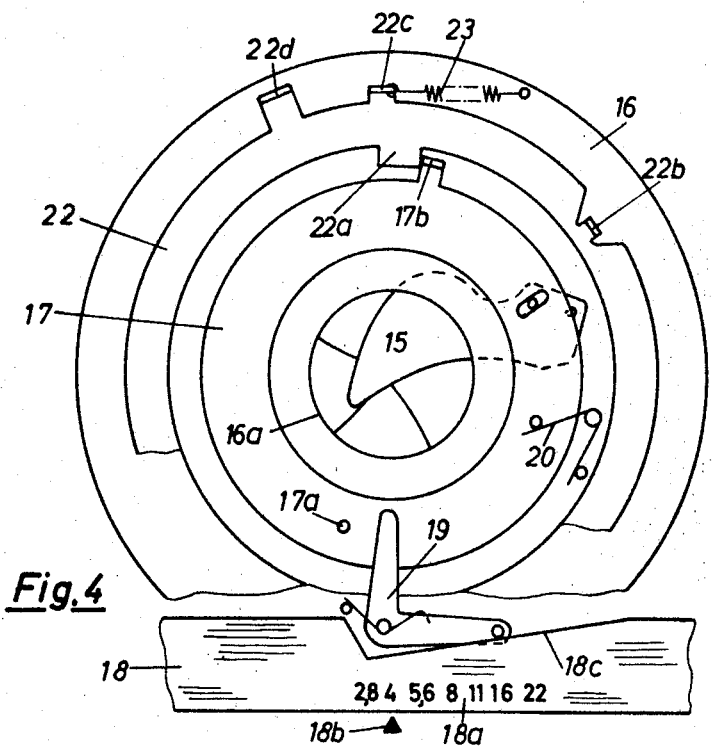

Reference should now be made to the accompanying drawings in which:

FIG. 1 is a plan view of the mechanism driving the first blade system in the cocked position, FIG. 2 shows the second blade system which acts as a diaphragm, the driving ring of which is also in the cocked position, FIG. 3 shows a view similar to FIG. 1 of the first blade system in the open position, FIG. 4 shows the second blade system in the closed position ending an exposure operation, FIG. 5 shows the opening blades in a movement phase during their closing procedure, which follows the closing movement of the second blade system, FIG. 6 shows the circuit diagram of the electric timing device, FIG. 7 shows the components serving to carry out "B" (time) exposures.

In the drawings FIG. 1, the numeral 1 denotes the base plate of a lens shutter and 1a the exposure aperture thereof. The latter has associated therewith a first blade system, 2, which is adapted to be moved into an open and then a closed position by means of a coaxially mounted ring 3. The drive of the first blade system 2 is effected by means of a transverse action crank train, which is formed of a cocking shaft 4, a driving disc 5 nonrotatably mounted thereon and a driving pawl 6 connected thereto. For locating the transverse action crank train which is subject to the action of a driving spring 7, a stop lever 8 is provided which, as shown in the drawing, assumes a position with one end in front of an edge 5a of the driving disc 5, whilst the other end cooperates with a release lever 9. The latter has a release member 10 associated therewith which is displaceably guided in the camera housing (indicated schematically). When the release member 10 is depressed, swiveling the stop lever 8 in a clockwise direction, the driving disc 5 is released, moving the first blade system 2 into an open position. On reaching this position, the driving disc 5 makes contact with the edge 5a of a pivoted catch lever 13, which blocks further movement of the blade drive.

The shutter has a second blade system 15 (FIG. 2) which acts as a diaphragm, and is actuated to close the lens aperture before the return of the first blade system 2 into a normal position. The second blade system 15 is located below the shutter base plate 1. For the sake of clarity, however, the apparatus of FIG. 2 is shown separately. The second blade system 15 is mounted on a supporting plate 16 which is provided with a opening 16a) with the exposure aperture 1a. The blades 15 are positively connected with an actuating ring 17 mounted rotatably about the opening 16a The ring 17 is manually preset to the required aperture (diaphragm aperture) by a setting member 18 shown (simplified) in the drawing as a slider though it is usually a ring. The adjustment is effected by way of a diaphragm scale 18a and a mark 18b. There is a positive connection between the setting member 18 and the actuating ring 17. Preferably this is a pivoted bellcrank lever 19. One of the arms of this lever cooperates with a control cam 18c formed on the setting member 18; the other arm cooperates with a pin 17a located on the actuating ring 17. A spring 20 acting on the actuating ring 17 retains these parts in abutment with one another. The arrangement is such that with a displacement of the setting member 18 to the left as seen in FIG. 2, the ring 17 is rotated in a clockwise direction, resulting in a reduction of the polygon opening formed by the blade system 15. When the setting member 18 is moved in the opposite direction, the actuating ring 17 biased by the spring 20 follows this movement and the blade system 15 is opened. Consequently the diaphragm aperture can be set by the use of scale 18.

As shown in FIG. 2, the second blade system 15 has a driving ring 22 with a driving spring 23 which tends to rotate the ring clockwise from the cocked position shown. The driving ring 22 has a shoulder 22a formed thereon which, when the ring leaves the cocked position, subsequently makes contact with the flap 17b of the actuating ring at a point depending upon the presetting of the setting member 18. This moves the ring 17 to close the blade system 15. To locate the driving ring 22 in its normal position an electromechanical locking device is provided. The latter includes a stop lever 26 mounted on a fixed pin 25, the lever at one end carrying an armature 28 cooperating with an electromagnet 27. In the position of the stop lever 26 shown in FIG. 1 in which the armature 28 is already supported against the electromagnet 27, one catch edge 26a of the stop lever is already in the path of movement of a flap 22b of the driving ring 22. In order to bring the armature 28 positively into abutment with the electromagnet 27 when cocking the sliding gear crank train 4, 5, 6, serving to drive the first blade system 2, a draw-over pawl 30 (FIG. 5) is provided which is mounted coaxially with the stop lever 26. The draw-over pawl 30 is resiliently supported relative to the lever and is so formed that it assumes a position in the movement path of a projection 5b provided on the driving disc 5. The driving disc 5 of the sliding gear crank train has a radially directed arm 5c which cooperates with a lug 22c provided on the driving ring 22, in such a manner that when the driving disc 5 is moved into the cocked position, the driving ring is engaged and hence also brought into the cocked position. On reaching this point, the driving disc 22 is locked by the stop lever 26. A further lug 22d is formed on the driving ring 22 with the object of knocking the catch lever 13 from a stop position in which it retains the blade system 2 open.

To control the above-described electromechanical locking device which blocks the ring 22 in the cocked position, there is used in known manner an electronic switching circuit device consisting of a transistorized relaxation circuit is used (FIG. 6). Apart from the transistors $T_1$, $T_2$ and $T_3$, the switching device carrying out the function of time control is provided with an RC circuit comprising a photosensitive resistor 32 and a capacitor C. The aperture preset by the second blade system 15 and of recessing the film sensitivity, is taken into account by means of a variable shading mask 33 placed in front of the photosensitive resistor 32. The electronic timing device is connected to a battery E by switch S1 when the camera release 10 is actuated. Two changeover switches $S_2$ and $S_3$ are actuated by the shutter blade ring 3; the first mentioned switch in the contact position shown short circuits the capacitor C, and in its other contact position establishes a parallel connection to the make switch $S_1$. In the inoperative position of the shutter the changeover switch $S_3$ connects the photosensitive resistor 32 to a moving-coil meter 35 which indicates in advance the exposure time to be expected. When the switch $S_3$ changes over into its other contact position on contacting the shutter blade ring 3 the photosensitive resistor is connected to the capacitor C. The switches $S_2$ and $S_3$ are changed over in the embodiment shown by means of two pins 3a and 3b arranged on the shutter blade ring 3.

The shutter described above operates as follows:

In the coked position all parts assume positions shown in FIGS. 1 and 2. When the camera release 10 is actuated, closure of the switch $S_1$ first energizes the electronic circuit; transistors $T_2$ and $T_3$ conduct, whilst transistor $T_1$ is blocked. As a result the electromagnet 27 is traversed by a current which causes the stop lever 26 to be retained in the stop position against the action of the spring 36. During the latter part of the release movement the driving disc 5 is released. This starts to move in a clockwise direction and drives the first blade system 2 into the open position. On arriving there the edge 5a of the driving disc 5 contacts the end of the catch lever 13, which now blocks the whole system, hence preventing the blades 2 from returning immediately into their closed position.

The movement of the blade ring 3 changes over the switches $S_2$ and $S_3$ into their working positions (not shown) resulting in the capacitor C being charged via the photosensitive resistor 32. The changeover switch $S_2$ simultaneously makes a parallel circuit across switch $S_2$ and hence ensures the full functioning of the electronic time control device. When the capacitor C has reached the base potential of transistor $T_1$, it conducts and hence blocks $T_2$ and $T_3$, thus cutting the current through the electromagnet 27. The stop lever 26, moving ;out of the locking position, releases the driving ring 22. The latter starts to moved and subsequently engages the actuating ring 17 of the second blade system 15 so as to transfer it from its present open position to the closed position shown in FIG. 4, whereby the exposure action initiated by the first blade system 2 is terminated. In the end phase of the movement of the driving ring 22, the latter makes contact with the catch lever 13 by means of lug 22b, and knocks the lever out of the stop position assumed hitherto. The driving disc 5, which has moved the blades 2 into the open position via driving pawl 6 and blade ring 3, is now able to continue its rotary movement under the influence of the driving spring 7 and hence to transfer the blade system 2 again into its closed position. During a subsequent cocking action the edge 5b of the driving disc 5 causes the stop lever 26 to abut against the electromagnet 27, and the driving ring 22 is moved into the cocked position by means of the arm 5c.

FIG. 7 shows a further development of the lens shutter described above, which enables "B" (time) exposures to be carried out apart from exposures with automatically controlled exposure time. For this purpose the stop lever 8 retaining the driving disc 5 in the cocked position has an additional pivoted lever catch 38 operationally associated therewith. This lever in turn cooperates with a range setter 40 adjustable to either of the two adjusting positions "Auto" and "B". This range setter in turn has a contact switch $S_4$, shown in broken lines in FIG. 6, associated therewith which in the setting position "Auto" remains closed. In the setting position "Auto" the lever catch 38 is retained in the position shown in FIG. 7 by the range setter 40, the projection 38a of this lever being located outside the path of movement of the lug 22d of the driving ring 22. Therefore the action of this ring acts as described above after a time interval determined by the electronic timing device, and thus moves the second blade system into the closed position, followed by the first blade system 2.

When the range setter 40, however, is set to "B," then the arm 38b of the lever catch 38 is located opposite a recess 40a of the setting member. In this setting position switch $S_4$ is held in the open position by a pin 40b of the range setter 40, which means that the current supply both to the electronic timing device and to the electromagnet of the electromechanical locking device is interrupted. When the release lever is actuated, the stop lever 8 rotates clockwise and releases the driving disc 5. The latter starts up, and when the open position of the first blade system 2 has been reached, is blocked by the lever catch 13. The rotary movement of the stop lever 8 follows that of the lever catch 38, the projection 38a of which assumes a position in front of the lug 22d and consequently locks the driving ring 22 in the cocked position. As a result the shutter remains open until the camera release 10 is raised. Relieving the camera release causes the lever catch 38 to be moved out of the stop position by the returning stop lever 8, so that the driving ring 22 is now able to fulfill its normal function.

What I claim is:

1. A photographic lens shutter including first blade means operable to move into the open and closed position and to fully expose the lens aperture in the open position, second blade means manually presettable as a diaphragm and operable to close the lens aperture, electronic timing means being provided to cause said second blade system into the closed position after a time interval beginning with the opening of said first blade system, said first blade means being movable by a driving mechanism having a cooperating stop blocking said driving mechanism when the blades of said first blade means have reached the open position, said second blade means having a driving mechanism cooperating with an electromechanical locking device operable by said electronic timing means to release said driving mechanism for said second blade means, a release member on said driving mechanism of said second blade means, said release member in the end phase of the movement of said driving mechanism of said second blade means being engageable with said stop to release said driving mechanism of said first blade means.

2. The photographic lens shutter of claim 1, wherein said stop cooperating with said first blade means is formed as a lever catch, and wherein said driving mechanism of said second blade means includes a ring movable into the cocked position against the bias of a spring, and wherein said electromechanical locking device has a spring-loaded stop lever provided with a catch edge and an armature on one end cooperating with an electromagnet connected in the circuit of said electronic timing device.

3. The photographic lens shutter of claim 2 wherein said driving mechanisms of said first and second blade means are operable to be transferred simultaneously into the cocked position.

4. The photographic lens shutter of claim 3 wherein said driving mechanism of the first blade means is operably connected with said driving mechanism of said second blade means during the cocking movement.

5. The photographic lens shutter of claim 4 wherein said second blade means is engaged by a manual actuating mechanism for presetting the required aperture.

6. The photographic lens shutter of claim 4 wherein for time exposures said second blade means has a catch lever associated therewith and being acted upon both by a range setter and the shutter release to give time exposures, said range setter being operable to actuate a cutout switch for said electronic timing means.

7. A photographic lens shutter including first blade means operable to move into the open and closed position and to fully expose the lens aperture in the open position, second blade means presettable as a diaphragm and operable to close the lens aperture before the return of said first blade means to the closed position, electronic timing means being provided to cause said second blade system into the closed position after a time interval beginning with the opening of said first blade system, said first blade means being movable by a driving mechanism having a cooperating lever catch blocking said driving mechanism when the blades of said first blade system have reached the open position, said second blade means having a driving mechanism cooperating with an electromechanical locking device operable by said electronic timing means for releasing said driving mechanism for said second blade means, a release member on said driving mechanism of said second blade means, said release member in the end phase of the movement of said driving mechanism of said second blade means being engageable with said lever catch to release said driving mechanism of said first blade means.

8. The photographic lens shutter of claim 7 wherein said driving mechanism of said second blade system includes a ring movable into the cocked position against the bias of a spring and wherein said electromechanical locking device has a spring-loaded stop lever provided with a catch edge engageable with said ring and an armature on one end of said stop lever cooperating with an electromagnet connected in the circuit of said electronic timing device.

9. The photographic lens shutter of claim 8 wherein the driving mechanism of said first blade means is connected to a driving disc and wherein said driving disc is engageable with said ring for moving said first and second blade means simultaneously into the cocked position.

10. The photographic shutter of claim 9 wherein for time exposures said second blade means has a catch lever associated therewith and being acted upon both by a range setter and the shutter release to give time exposures, said range setter being operable to actuate a cutout switch for said electronic timing means.